US008855213B2

(12) United States Patent
Filippini et al.

(10) Patent No.: US 8,855,213 B2
(45) Date of Patent: Oct. 7, 2014

(54) RESTORE FILTER FOR RESTORING PREPROCESSED VIDEO IMAGE

(75) Inventors: Gianluca Filippini, Los Gatos, CA (US); Xiaosong Zhou, San Jose, CA (US); Hsi-Jung Wu, San Jose, CA (US); James Oliver Normile, Los Altos, CA (US); Xiaojin Shi, Santa Cruz, CA (US); Ionut Hristodorescu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1243 days.

(21) Appl. No.: 12/463,913

(22) Filed: May 11, 2009

(65) Prior Publication Data
US 2010/0246691 A1  Sep. 30, 2010

Related U.S. Application Data

(60) Provisional application No. 61/163,684, filed on Mar. 26, 2009.

(51) Int. Cl.
| | |
|---|---|
| H04N 7/12 | (2006.01) |
| H04N 11/02 | (2006.01) |
| H04N 5/14 | (2006.01) |
| G06K 9/36 | (2006.01) |
| H04N 19/122 | (2014.01) |
| H04N 19/91 | (2014.01) |
| H04N 19/176 | (2014.01) |
| H04N 19/154 | (2014.01) |
| H04N 19/124 | (2014.01) |
| H04N 19/103 | (2014.01) |
| H04N 19/61 | (2014.01) |

(52) U.S. Cl.
CPC ... *H04N 19/00084* (2013.01); *H04N 19/00951* (2013.01); *H04N 19/00278* (2013.01); *H04N 19/002* (2013.01); *H04N 19/0009* (2013.01); *H04N 19/00018* (2013.01); *H04N 19/00781* (2013.01)
USPC .............. 375/240.29; 348/701; 382/286

(58) Field of Classification Search
CPC ........... H04N 19/00018; H04N 19/00951; H04N 19/00084; H04N 19/00781; H04N 19/0009; H04N 19/00278; H04N 19/002; G06T 5/002
USPC .............................. 375/240, 240.29
See application file for complete search history.

(56) References Cited

U.S. PATENT DOCUMENTS

| | | | | |
|---|---|---|---|---|
| 6,100,689 | A * | 8/2000 | Huff et al. | 324/309 |
| 2004/0066203 | A1* | 4/2004 | Boss et al. | 324/613 |
| 2005/0276515 | A1* | 12/2005 | Shekter | 382/286 |

(Continued)

FOREIGN PATENT DOCUMENTS

WO    WO 2009098546 A1 *   8/2009

*Primary Examiner* — Sath V Perungavoor
*Assistant Examiner* — Xiaolan Xu
(74) *Attorney, Agent, or Firm* — Kenyon & Kenyon LLP

(57) ABSTRACT

Embodiments of the present invention provides a method and device for processing a source video. The method and device may provide computing an artifact estimation from differences among pixels selected from spatially-distributed sampling patterns in the source video; filtering the source video to produce a filtered version of the source video, computing a blending factor based on the artifact estimation in the source video, and computing an output video by blending the source video and the filtered version of the source video based on the blending factor.

20 Claims, 13 Drawing Sheets

(56) References Cited

U.S. PATENT DOCUMENTS

| | | | |
|---|---|---|---|
| 2006/0109155 A1* | 5/2006 | Jensen | 341/144 |
| 2007/0139567 A1* | 6/2007 | Zhong | 348/701 |
| 2008/0205854 A1* | 8/2008 | Xu et al. | 386/114 |
| 2009/0167951 A1* | 7/2009 | Chiu | 348/607 |

* cited by examiner

RESTORE FILTER FOR RESTORING PREPROCESSED VIDEO IMAGE

CROSS-REFERENCE TO RELATED APPLICATIONS

This application claims priority to U.S. Provisional Patent Application No. 61/163,684, filed Mar. 26, 2009, entitled "Blind Noise Analysis For Video Compression," which is herein incorporated by reference in its entirety.

FIELD OF THE INVENTION

The present invention is generally directed to restoring video frames from undesirable artifacts. In particular, the present invention is directed to a restore filter for optimally blending a preprocessed video with a source video that includes noise, where the blending factor is estimated from an artifact estimation in the source video.

BACKGROUND INFORMATION

Studio video content producers often pre-edit uncompressed video to fit different requirements for channel distribution and format conversion. Another important and common edit step may be the color and film matching (also called analog support), which may require the injection of random noise into video frames to match characteristics of an analog film. Further, when the source video or film includes computer-generated graphics, a large amount of noise may be purposefully added in areas of uniform colors to create natural-looking effects.

The need for color dithering may arise because of a reduction in bit precision. An analog source material may be digitized with high bit precision, e.g., 14, 12, or 10 bits per channel (each channel representing luma or chroma in YUV or RGB) in a standard color space (4:4:4 in Society of Motion Picture and Engineers or SMPTE spec), while the final cut (uncompressed video) may be in a lower precision format, e.g., 8 bits per channel of e.g., YUV 4:2:2 or less. The conversion from high to low precision quantization may produce artifacts and require dithering to create virtual intermediate levels of colors not available in the final color space or bit depth. Finally, a global control of noise level, or noise modulation, may be used to create an overall visually persistent effect on a user, especially for situations such as luminance fading, dimming light, which are common in, e.g., titles or low light scenes. The final results of all this "in-house" processing may be given to distributors, e.g., an Apple iTunes store to be encoded in multiple formats, bitrates, or standards, e.g., H.264 for video compression.

Video materials having pre-edited content (even if in a 10 or 8 bit, non-compressed format) may create challenges to a block-based video encoder, e.g., a H.264 type encoder. For example, the effects of all these noise adding processes (for quality purpose) may affect multiple stages of an encoder including the motion estimation that matches blocks of images based on a sum of absolute difference (SAD) metrics.

A video encoder may cause compression artifacts of quantization and/or block artifacts. When compression artifacts are present in a video region that includes additive noise, they may become even more evident and visually annoying to a viewer because the geometrically defined structures of the compression artifacts may present in a random isotropic region. The persistent artifacts on a playback screen may create unnatural effects which may degrade the perceptual quality.

In low bit rate video encoding, the additive noise from film production may also make it more difficult to achieve high perceptual quality since high frequency noise may affect the quantization process and the rate distortion optimization (RDOPT). In fact, some techniques used to maximize the video quality in the final cut production may actually prevent low bit rate video encoding to achieve the maximum overall quality.

Since additive noise introduced from film post production may adversely affect the subsequent coding and decoding steps, it is advantageous to estimate the additive noise so that the additive noise may be properly treated in the subsequent coding and decoding steps.

When video is encoded at a very low bit rate (e.g., at 64 kilo bits per second (kbps) or 24 kbps) using coarse quantization, it may not be possible to encode all of the noise (or dithering) information in the source video since noise (including those quantization artifacts) tends to be information of high frequency and may have been removed during the quantization process. Since noise may affect components of the encoder (e.g., motion estimation, mode prediction decision, or rate distortion optimization), a preprocessing filter is often used to generate a filtered video frames. For example, the preprocessing filter may remove noise for improved coding efficiency. However, the preprocessing filter may also be filters other than denoise filter. For example, the filter may be a smooth filter or color correction filter.

Different denoise filters may be classified into spatial, temporal, or hybrid of spatial and temporal filters. Spatial denoise filters remove noise based on pixels in a single video frame. Temporal denoise filters remove noise based only on temporal information. Hybrid denoise filters use both spatial and temporal information to remove noise.

A type of commonly used hybrid denoise filters is motion compensated denoise filters in which trajectories of pixels are computed via, e.g., commonly known optical flow methods. For a particular video frame, motion compensated filters may average pixel values from previous and subsequent video frames based on the motion estimation to obtain a filtered version of the video frame. However, optical flow may be difficult to compute for it is an ill-posed mathematical problem. The solution of optical flow may require solving an optimization problem to achieve an accurate motion estimation. Under certain scenarios, e.g., scene changes or low lights, it may be even more difficult to accurately estimate optical flows.

The main issue with motion compensated denoise filters is that they tend to remove details in video frames and introduce artifacts or mismatches that may be perceived as unnatural by viewers. Therefore, there is a need for more efficient ways to generate naturally-looking denoised video.

DETAILED DESCRIPTION OF EXAMPLE EMBODIMENTS

Embodiments of the present invention provides a method and device for processing a source video. The method and device may provide computing a noise estimation from differences among pixels selected from spatially-distributed sampling patterns in the source video; filtering the source video to produce a filtered version of the source video that is substantially free of noise, computing a blending factor based on a noise estimation in the source video, and computing an output video by blending the source video and the filtered version of the source video based on the blending factor.

According to one example embodiment of the present invention, a noise map, e.g., an array of one numerical value per sample, may be computed to provide a noise measure in a source video. The noise map may be a binary map, each sample of which indicates a noise state (e.g., "1") or a noiseless state (e.g., "0"). Alternatively, the noise map may include samples of integers, each of which indicates an estimated noise strength. For example, with byte integers, a "0" may indicate noiseless and a "255" may indicate maximum noise.

According to one example embodiment of the present invention, the additive noise may be modeled as uncorrelated noise in the sense that the noise may not contain any spatial structure in the picture domain, or a predominant frequency range in a transformed frequency domain obtained, e.g., by a Fourier transform. The noise may not necessarily be white noise, i.e., it may have a spectrum of limit width, but it should be quite uniform within its spectrum range.

In one example embodiment of the present invention, the analysis of noise is blind, i.e., there is no knowledge as to which types of pre-production process have been utilized, and no knowledge as to which types of noise or dithering have been added to the original source pictures.

In one example embodiment of the present invention, a pre-processing functional unit may parse input pictures from a source video content and provide pre-processed image frames to a video encoder. Simultaneously, the pre-processing unit may through a separate channel provide extra information about, e.g., the additive noise in pictures, to the video encoder. This extra information may be used to control coding steps, e.g., in the inner loop of an encoder or a decoder.

Figure 1:
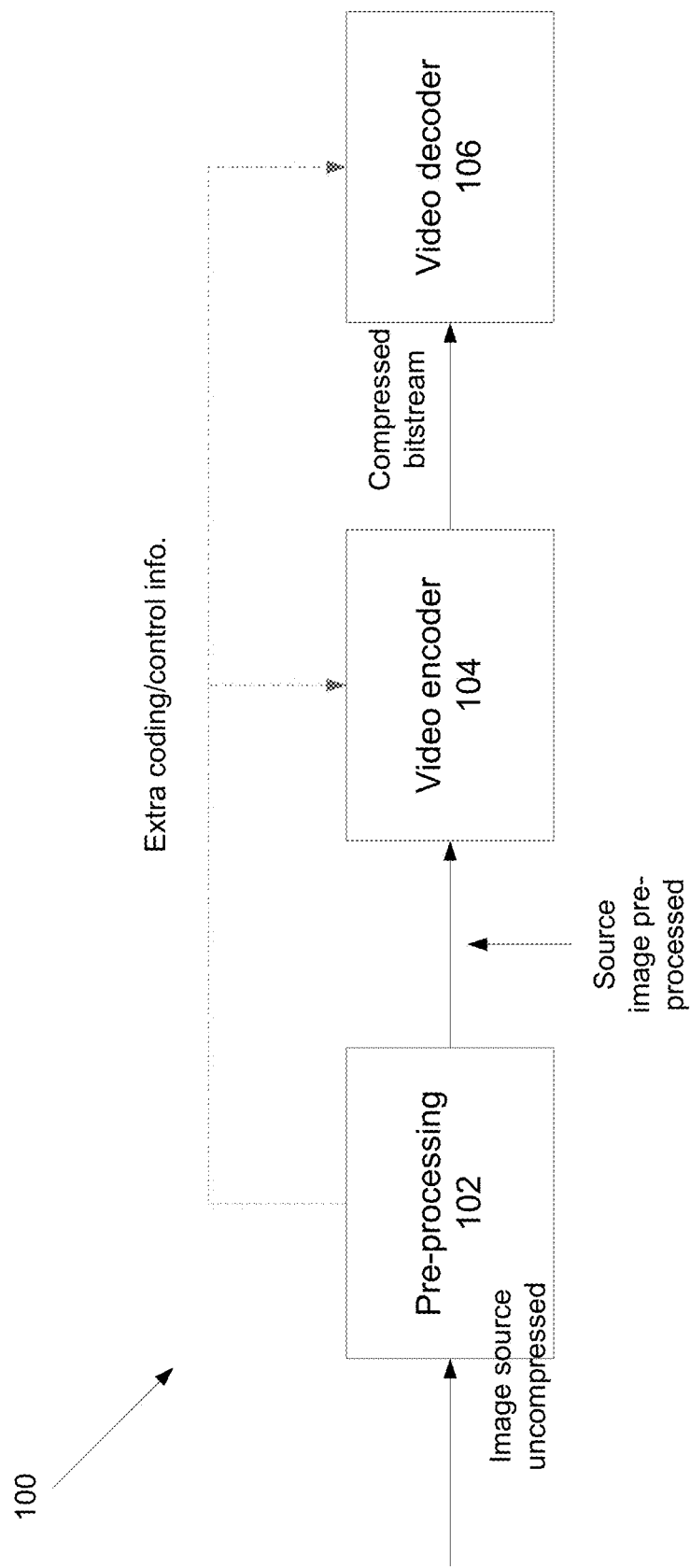
FIG. 1 shows a global schematic diagram of video encoding including a pre-processor for noise filtering according to one example embodiment of the present invention.

FIG. 1 shows a global schematic diagram of video encoding including a pre-processor for noise filtering according to one example embodiment of the present invention. In this example system 100 for additive noise estimation, a source, e.g., an uncompressed video, may be provided to a pre-processor 102 which may internally have two separate pipelines,—one for analysis and one for filtering. The analysis of input video in general may extract extra coding and/or control information from the input video without altering the content. The filtering of input images may produce filtered input video. Both the extra coding/control information, and the filtered input video may be provided to a video encoder 104 for an enhanced encoding of source input video and/or a video decoder 106 for improved video decoding. The input video may include a plurality of picture frames, e.g., 60 picture frames per second. Each frame may further include a plurality of pixels arranged in an array, e.g., a 1080 by 720 pixels for HD video.

Figure 2:
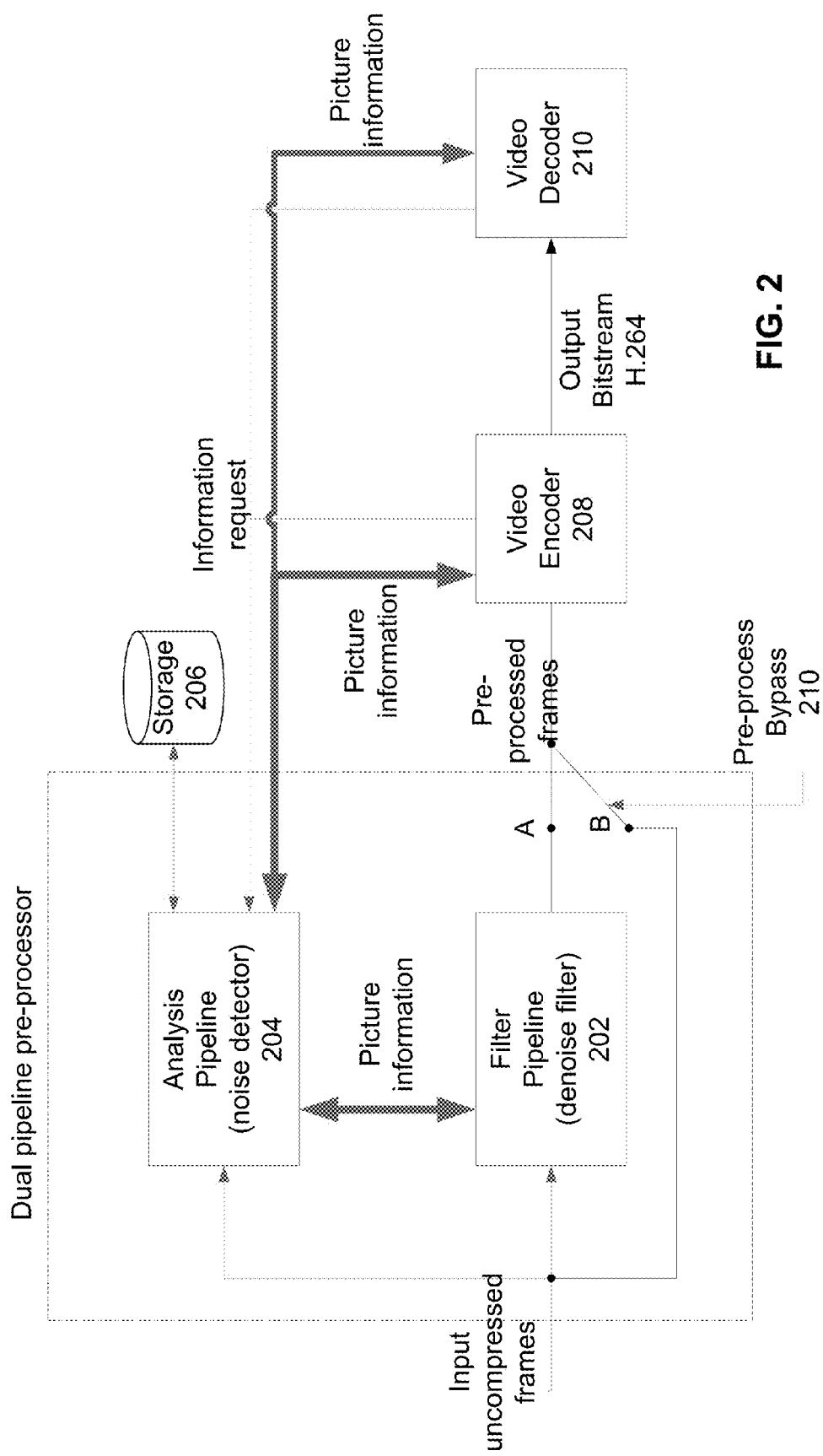
FIG. 2 shows a diagram of video encoding including a pre-processor for estimating control parameter adjustments to an encoder based on noise estimation according to one example embodiment of the present invention.

FIG. 2 shows a diagram of video encoding including a pre-processor for estimating control parameter adjustments to an encoder based on noise estimation according to one example embodiment of the present invention. In one example embodiment of the present invention, both the filtering pipeline 202 and the analysis pipeline 204 may be connected to a main memory bus (which may in turn be connected to a processor (not shown)) to retain input video or picture frames from input buffers. The analysis pipeline 204 may read one or more picture frames from input buffers and store results in a storage 206. The filtering pipeline may process input video or picture frames from input buffers and provide the processed picture frames to an encoder 208. In an alternative embodiment of the present invention when the pre-processor bypass switch 210 is switched to a pre-processing bypass position B, the input uncompressed images may be provided directly to the video encoder 208.

In one example embodiment of the present invention, the analysis pipeline may include a noise detector for detecting or evaluating noise in the source video or in frames of the source video. The type of noise may include additive noise or compression artifacts. The noise detection may be measured based on conventional directional band-pass filters (e.g., a directional difference of gaussians type of filters), or weighted sum of absolute differences (WSAD) as discussed later for a segment of the source video. Alternatively, instead of using spatial directional filters, the noise detection may be accomplished by filtering in the frequency domain, e.g., by selecting multiple patches of frequencies that represent different spatial directions, and by computing and comparing the energy in different patches. Exemplary patches may include the low-high, high-high, high-low, and high-low frequency bands of a 2D DCT. The segment of video may include one or more video frames of the source video. The output the of noise detector may be called picture information in the form of, e.g., a noise map, that indicates locations of noise in the video and strengths of the noise.

In another example embodiment, the noise detection may be carried out in 3D, e.g., in a spatio-temporal domain. A segment of multiple picture frames over a period of time may be used for noise detection. In one example, each picture frame in the segment may be motion compensated and summed up to generate an accumulated or alternatively an average frame, from which noise in the segment may be detected. Alternatively, a 3D filter, e.g., a 3D difference of gaussians filter or 3D WSADs may be directly applied the segment of picture frames. The 3D WSADs may be computed from 3D (spatial+temporal) sampling patterns. For example, a stack of video frames may be partitioned into cubes of pixels in the 3D spatio-temporal space like blocks of pixels. Within each cube of pixels, random sampling patterns may be generated for computing WSADs.

The encoding of the source video may be controlled by a set of control parameters including, but not limited to, e.g., qp (quantization parameter, per frame or per Macroblock), entropy coding mode, mode decision (inter/intra, block size, etc), transform size, qmatrix (quantization matrix). These control parameters may be initially set to default values. A collection of default control parameters may be called a default coding policy. In one embodiment of the present invention, the noise map may be used to compute adjustments to these control parameters so that the encoder may more efficiently code the source video according to the default coding policy and the control parameter adjustments.

In one example embodiment, the output may be an array of binary values for indicating the existence of noise. For example, a binary value one (1) may indicate noise and zero (0) may indicate no noise or substantially less noise. Each binary value may represent the presence of noise, e.g., at a pixel or within a pixel block. In one example embodiment, a threshold may be used to determine whether noise is present.

In another example embodiment, the output of the noise detector may be an array of integer values, each of which represents noise strength, e.g., at a pixel or within a block of pixels. In one example embodiment, the noise strength may be represented with integers of one byte length. Thus, a value of zero (0) may indicate noise-free and a value of 255 may indicate a maximum level of noise at the corresponding location in the video frame.

The filter pipeline 202 may include a preprocessing filter for generating filtered frames such as frames with noise removed. Both the filtering pipeline 202 and the analysis pipeline 204 may be connected to each other so that the analysis pipeline may transfer noise measures, e.g., noise maps, about the input video or picture frames to the filter pipeline. The filtering pipeline may then use the noise map to improve the filtering of input video or picture frames.

In one example embodiment, the output of the analysis pipeline 204 may be transmitted to the video decoder 210. The video decoder may use this information to drive post processing operations. In one example, the output may be noise maps to provide hints to the decoder as to the amount of noise the uncompressed video had at locations, e.g., pixels or blocks of pixels. The decoder may compare the noise in the decoded video, e.g., at pixel or pixel block locations, with the noise present in the uncompressed video. Based on the comparison, the decoder may decide whether to add noise to the decoded video.

The video encoder 208 may also send information request to the analysis pipeline 204 to request picture information on the video to be encoded or on previously inputted picture frames. Upon receiving the request, the analysis pipeline may provide requested picture information to the video encoder. 208 and/or a decoder 210. As discussed above, the picture information may include noise measures such as noise maps. The noise measure provided to the video encoder may determine video encoder control parameters 212 including, but not limited to, e.g., the quantization parameter (qp, per frame or per macroblock), entropy coding mode, mode decision (inter/intra, block size, etc.), transform size, and quantization matrix (qmatrix) as defined in, e.g., H.264 or MPEG standards.

In one example embodiment of the present invention, each picture frame may be further divided into blocks of pixels ("pixel blocks"), e.g., 8×8 or 16×16 pixels per block. Thus, each sample in a noise map may correspond to a noise measure for a block of pixels. This may be particularly advantageous for a block-based video encoder, e.g., an H.264 type of video encoder. However, the size (or the location) of the input block of data used by the noise analysis pipeline may not be necessarily related to the pixel block size of the video encoder.

Each pixel may include one or more components, e.g., one luma and two chroma for YUV format, and red, green, blue for RGB format. The value of each component may be represented with a number of bits, e.g., 8 bits or 12 bits, called bit depth. The pixel block size used for the noise analysis may depend on the bit depth of the input picture frame (luma or chroma) and/or on the desired accuracy of the final noise measure. A too small block, thus small statistical sample size, may produce an unstable measure that may relate more to local variations of the input picture. The lower limit of the block size may be highly correlated to the bit depth, or number of bits per pixel. For an 8 bit non-compressed video, for example, an encoder may use a sample size of at least 50 to 80 pixels, e.g. using a pixel block of 8×8 pixels. A too large pixel block may produce a meaningless noise measure since it may be uncorrelated to local variations of the input picture. Additionally, the resolution of the input picture in terms of number of pixels may also affect the pixel block size, e.g., bigger pixel block sizes for bigger formats.

In one example embodiment of the present invention, the noise in a source video may be measured by a band-pass filter, e.g., a difference of gaussian (DOG) filter as conventionally known. Alternatively, the noise in the source video may be measured using weighted sum of absolute differences (WSAD) as discussed in the following.

Figure 3:
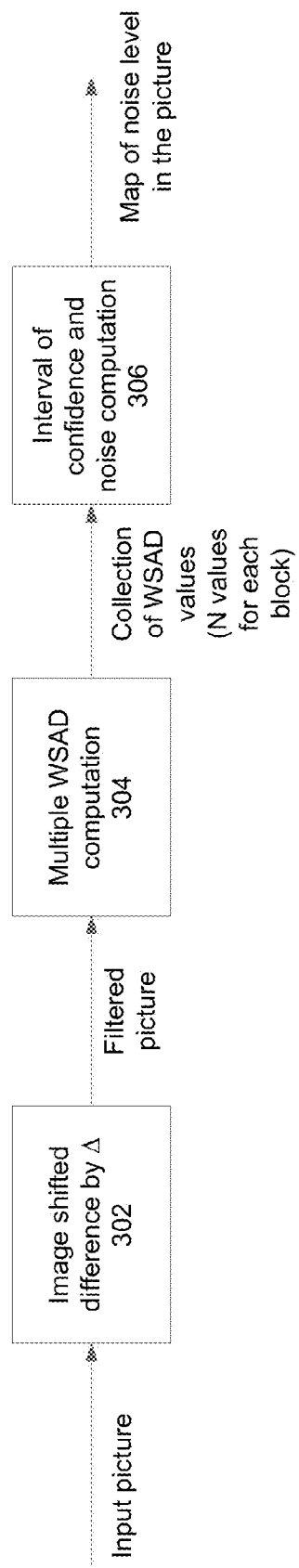
FIG. 3 shows a schematic diagram of noise analysis based on weighted sum of absolute differences (WSAD) computation according to one example embodiment of the present invention.

FIG. 3 shows a schematic diagram of noise analysis based on weighted sum of absolute differences (WSAD) computation according to one example embodiment of the present invention. The input picture may be divided into picture planes, each plane corresponding to a pixel component. For example, in an YUV color space, the three planes may correspond to one luma plane and two chroma planes. Alternatively, in an RGB color space, the three planes may correspond to red, green and blue colors. Each of the three planes may be further divided into blocks of pixels, e.g., blocks of 8×8 pixels.

At 302, a shift difference computation may be performed on the input picture. The input picture may be shifted both horizontally and vertically by a delta ($\Delta$) amount of pixels. The shifted version of the picture may be subtracted from the original picture to compute the difference between the original and the shifted version. This shifted difference operation may isolate all the irregularities in the input picture including, e.g., noise and sharp edges, in the original picture. The irregularities may be structured or non-structured features in the original source video frames. A structured feature may include, e.g., edges between objects or, caused by changes of lighting condition.

The amount of shift $\Delta$ may depend on the grain size of the noise, e.g., speckle noise, to be detected and with the resolution (in pixels) of the input picture. In one example embodiment of the present invention, for a picture frame of a resolution of 1080 by 720 pixels, the $\Delta$ may be in the range of one to five pixels. The main factor for determining $\Delta$ may be the maximum spatial frequency of the noise which is to be determined. Thus, the shift Δ may be computed as a function of the maximum noise frequency, grain size, and picture resolution.

The results of the shifted difference computation may include multiple blocks of e.g., 8×8 samples representing the shifted difference. For each pixel block, weighted sum of absolute differences (WSAD) may be computed (see detail in following) at 304. For each block, it is advantageous to compute at least two WSAD values. A greater number of WSAD values may increase the accuracy of the noise level measurements.

Figure 5:
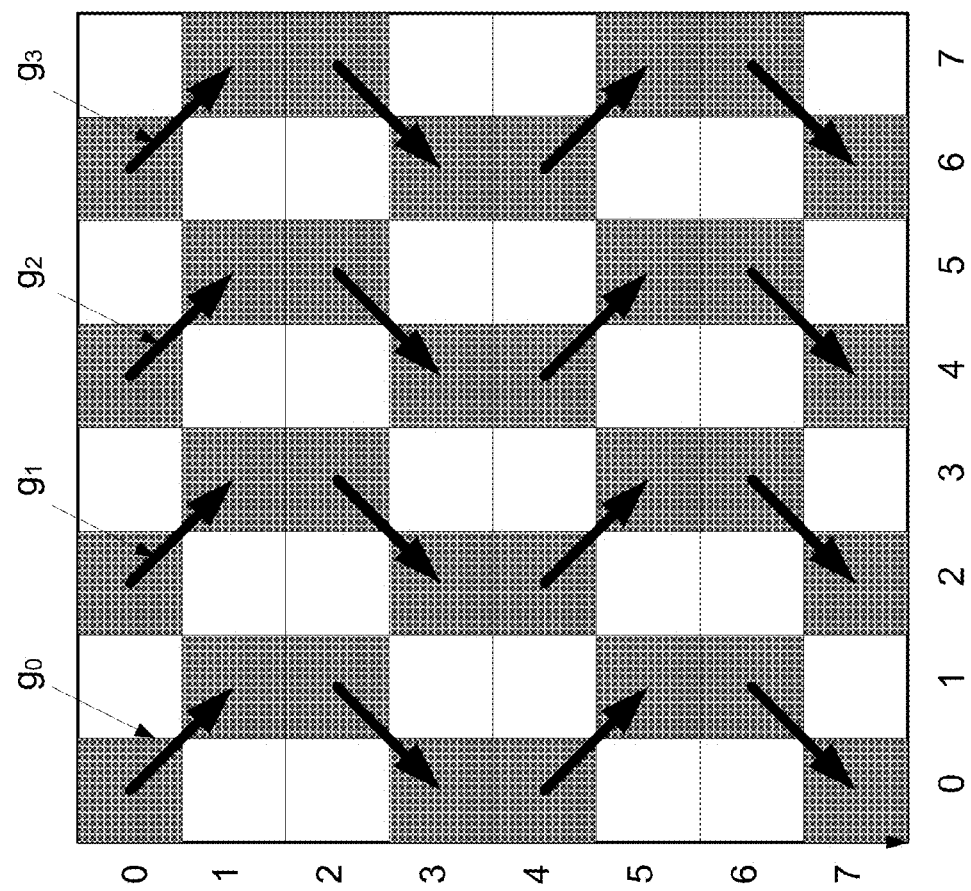
FIG. 5 shows a block of pixels and an example sampling pattern for computing local gradients according to one example embodiment of the present invention.

In one example embodiment of the present invention, WSAD values may be computed based on the difference between the original image and the shifted image. The objective is to measure noise in a pixel block using multiple local gradient measures. The gradients may simply be differences between pixels within the same block, which may be computed based on a pattern used to measure these differences. FIG. 5 shows one example pattern for computing differences between pixels. According to one example embodiment of the present invention, a core operator may be a variant of the commonly used sum of absolute differences (SAD) operator, i.e., weighted sad or WSAD.

The WSAD of this invention is defined differently from conventional SAD. First, in WSAD, a weighting function are applied to the SAD values to compute WSAD. In addition, the weights may be calculated as a function of the absolute differences, i.e., the weighting may be adaptive to the local pixel data. Thus the weighting may play an important role in detecting structured data in the pixel domain, or correspondingly predominant frequency in the transform domain.

Referring to FIG. 5, the picture block, e.g., 8×8 pixels, may represent a block of pixels in a resulting picture, e.g., a shifted difference picture as discussed above, or a picture block in a source picture of, e.g., pixel values representing luma or chroma. For convenience, both the shifted difference and the pixel in a source picture are referred to as pixel values hereafter. Local gradients may be computed based on these pixel values and a sampling pattern of these pixels. The sampling pattern may include multiple pairs of pixels for computing the difference between the two pixel values as a gradient value. In one example embodiment of the present invention, a sampling pattern may be arranged as shown in FIG. 5 so that gradients may be calculated according to the arrow directions. For example, the gradients may be calculated as $g_0 = P_{00} - P_{11}$, $g_1 = P_{20} - P_{31}$, etc., where $g_0, g_1$, etc. are gradients, $P_{00}, P_{11}, P_{20}, P_{31}$ etc. are pixel values. In this embodiment, total 16 absolute gradients may be calculated. Weights may then be applied to each local gradient, e.g., $g_0, g_1$ etc. where each of the weights may be a function of the local gradient. A WSAD may be computed as the sum of all these weights:

$$WSAD = \sum_{i=0}^{16} W(|g(i)|),$$

where W( ) is the weighting function.

A WSAD value may be determined by pixel sampling patterns and a weighting function W( ). In one example embodiment of the present invention, a V-shaped weighting function may be used for noise detection. The V-shaped weighting function may be varied to match different aspects of underlying noise.

Figure 6:
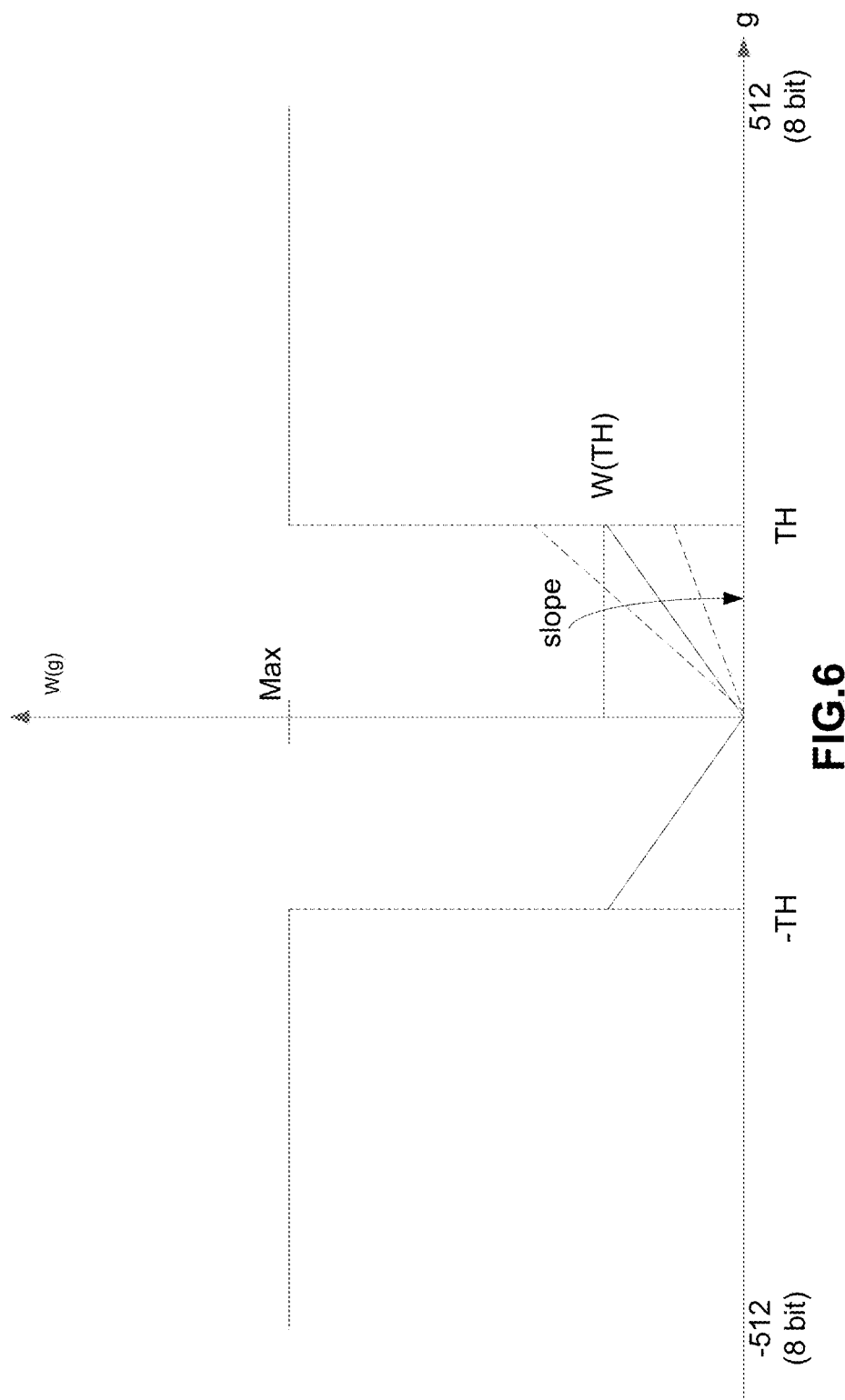
FIG. 6 shows an example V-shaped weighting function according to one example embodiment of the present invention.

FIG. 6 shows an example V-shaped weighting function according to one example embodiment of the present invention. In FIG. 6, the x-axis represents gradient values, and the y-axis represents weights as a function of gradient values. For gradient values that are within a range of [−TH, TH], the weighting function is a V-shaped curve, where TH is a positive number that may be determined as a function of signal to noise ratio (SNR). The slope of the V shape may be correlated to noise sensitivity. A steeper slope may reflect more sensitivity to gradient changes or noise measurements. Therefore, for gradients within the range, a WSAD value may increase with higher slopes and decrease with lower slope of the V shape. For gradient values outside the range [−TH, TH], the weighting function may be set to a constant value $W_{max}$, where $W_{max}$ may be correlated to the sample size within a block. In one example embodiment, $W_{max}$ value may be one order of magnitude greater than W(TH) value. The objective of choosing a greater $W_{max}$ may be to bias WSADs against sharp edges or structured data. In addition, $W_{max}$ may affect the total sensitivity of the total noise measure.

As discussed above, TH may be determined as a function of SNR that is acceptable to a user and be related to the luminance level. The TH value is a subjective characteristic of the human eyes, i.e., they are more sensitive to small luminance change within a certain range, e.g., [−TH, TH], but are more receptive to changes in darker or whiter areas. As such, human eyes may perceive similar quality even under less SNR in darker or whiter areas. In one embodiment, TH may vary based on SNR or local average luminance.

The WSAD values may also be determined by the pattern used to calculate gradients. The pixel sampling pattern may be different structured or random samplings of pixels in a block as long as they are used consistently through the whole process. Thus, within a block of pixel values, multiple WSADs may be calculated. The underlying noise pattern may be determined based on variations among multiple WSADs of a particular block. The pixel sampling pattern as shown in FIG. 5 may measure gradients along diagonal directions.

Figure 4:
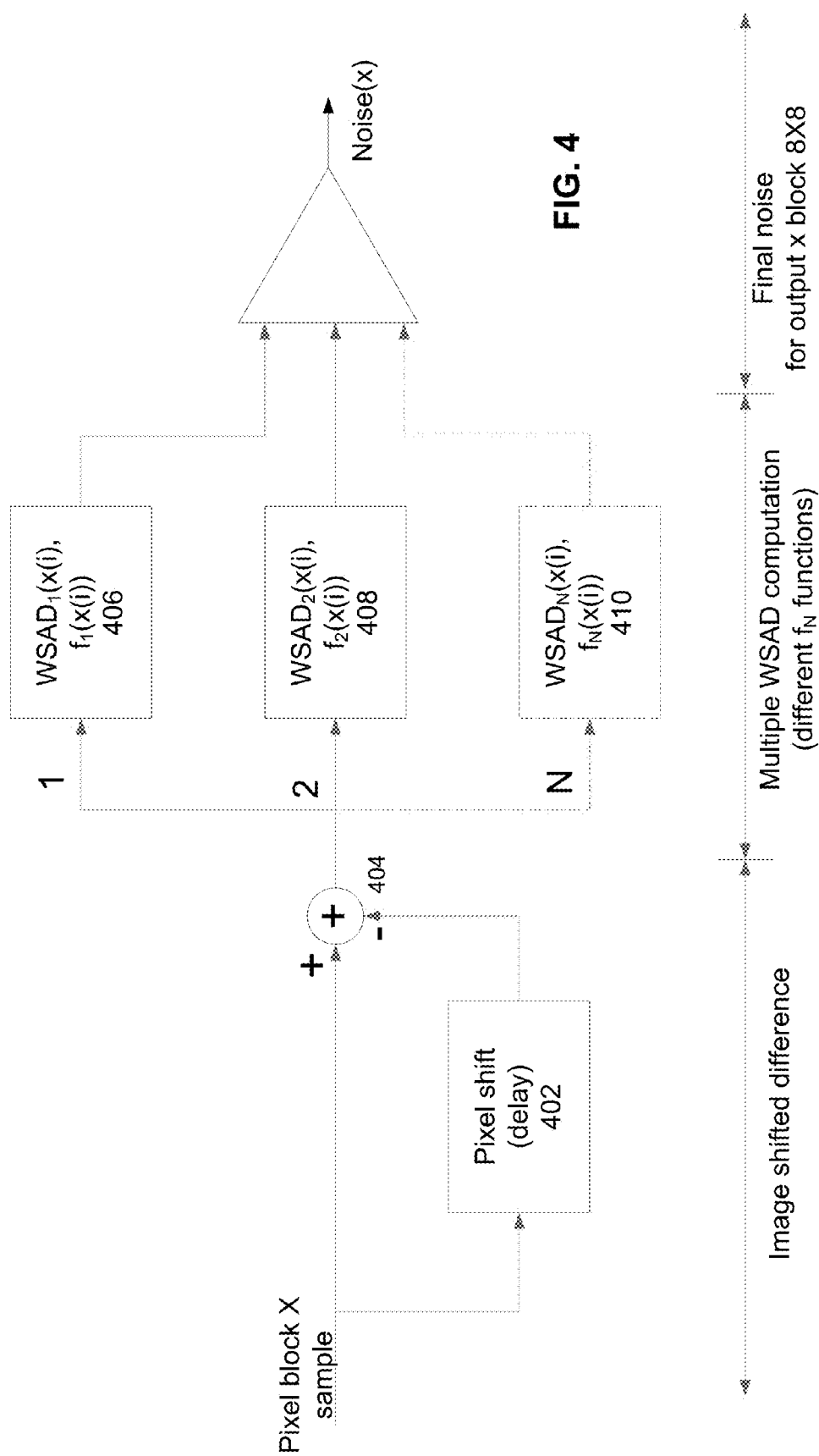
FIG. 4 shows a schematic diagram of multiple-WSAD value computation according to one example embodiment of the present invention.

In one example embodiment of the present invention, for each block of pixel values, multiple WSADs may be calculated. FIG. 4 shows a schematic diagram of multiple WSAD computation according to the example embodiment. Pixels in a block may first undergo a delayed shift at 402 and then be subtracted from the source pixel block at 404. Multiple WSADs may be calculated at 406, 408, and up to 410, based on different shift functions, $f_1, f_2, \ldots, f_N$. The WSADs may then be combined together for calculating a noise measure in the block.

Figure 7:
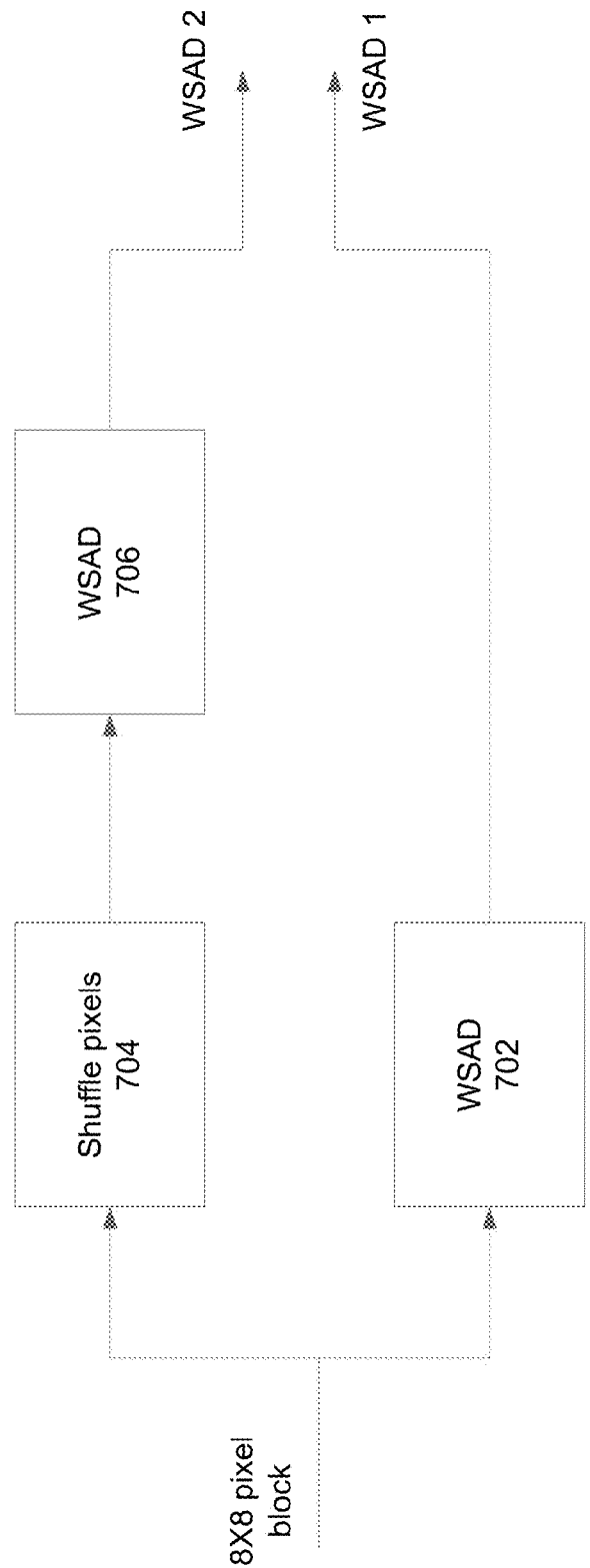
FIG. 7 shows a schematic diagram of generating additional WSAD values using shuffled pixels according to one example embodiment of the present invention.

In another embodiment of the present invention, two WSADs may be calculated for a block of pixels. Referring to FIG. 7, a first WSAD 1 may be calculated at 702 based on the pixel values in the block. For calculating a second WSAD 2, the pixels in the block may first be randomly shuffled at 704, and then WSAD 2 may be calculated at 706. The rationale behind this embodiment is that if the input block does not have details in picture or structured data, a specific WSAD operator may be invariant to a random shuffling of input data. In another word, if the noise is isotropic, the noise may not be sensitive to directions of evaluation. The noise, e.g., in regions with few details may be more evident to a user.

The shuffling function may take on different forms. In one example embodiment of the present invention, the shuffling function may be a simple transposition operation between pairs of pixels, i.e., exchange the position in a pair without affecting other pixels in a block. In another example embodiment, the shuffling may take place in a register that stores pixels. For the convenience of implementation, the shuffling may take place in an index shuffling in the register. For a block with pixels shuffled, a WSAD value may be calculated as $$WSAD = \sum_{i=0}^{BlockSize} W(|\text{pixel}(i) - \text{pixel}(f_s(i))|),$$

where $f_s$ is a shuffling function, pixel(i) is the pixel value at index i, and W( ) is the weighting function. As such, shuffling operation may be performed in the inner loop of gradient computation by simply modifying the pixel sampling pattern for gradient computation.

Figure 8:
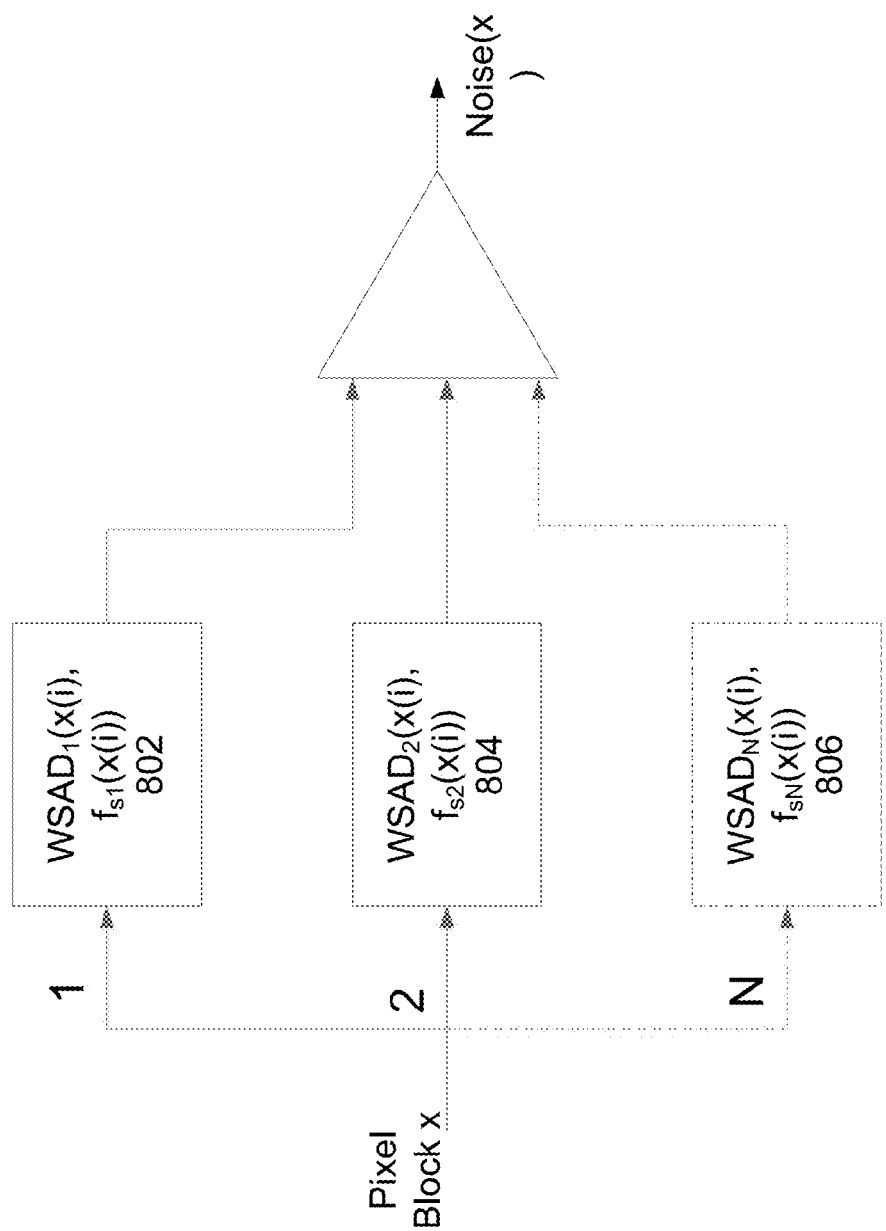
FIG. 8 shows an example combinations of shift difference and shuffle operation for computing WSAD values according to one example embodiment of the present invention.

In yet another embodiment of the present invention, the shifted difference calculation may be combined with the shuffling operation for a more compact calculation. FIG. 8 shows an example combinations of shift difference and shuffle operation for computing WSADs according to the example embodiment of the present invention. At each block, e.g., 802, 804, and 806, functions $f_{s1}, f_{s2}, \ldots$, and $f_{sN}$ may combine both shift and shuffle operations on pixel values x(i). WSAD1, WSAD2, . . . , WSAD N may then be calculated based on gradients derived from the block of shifted and shuffled pixels for the final noise measure for the block.

Figure 9:
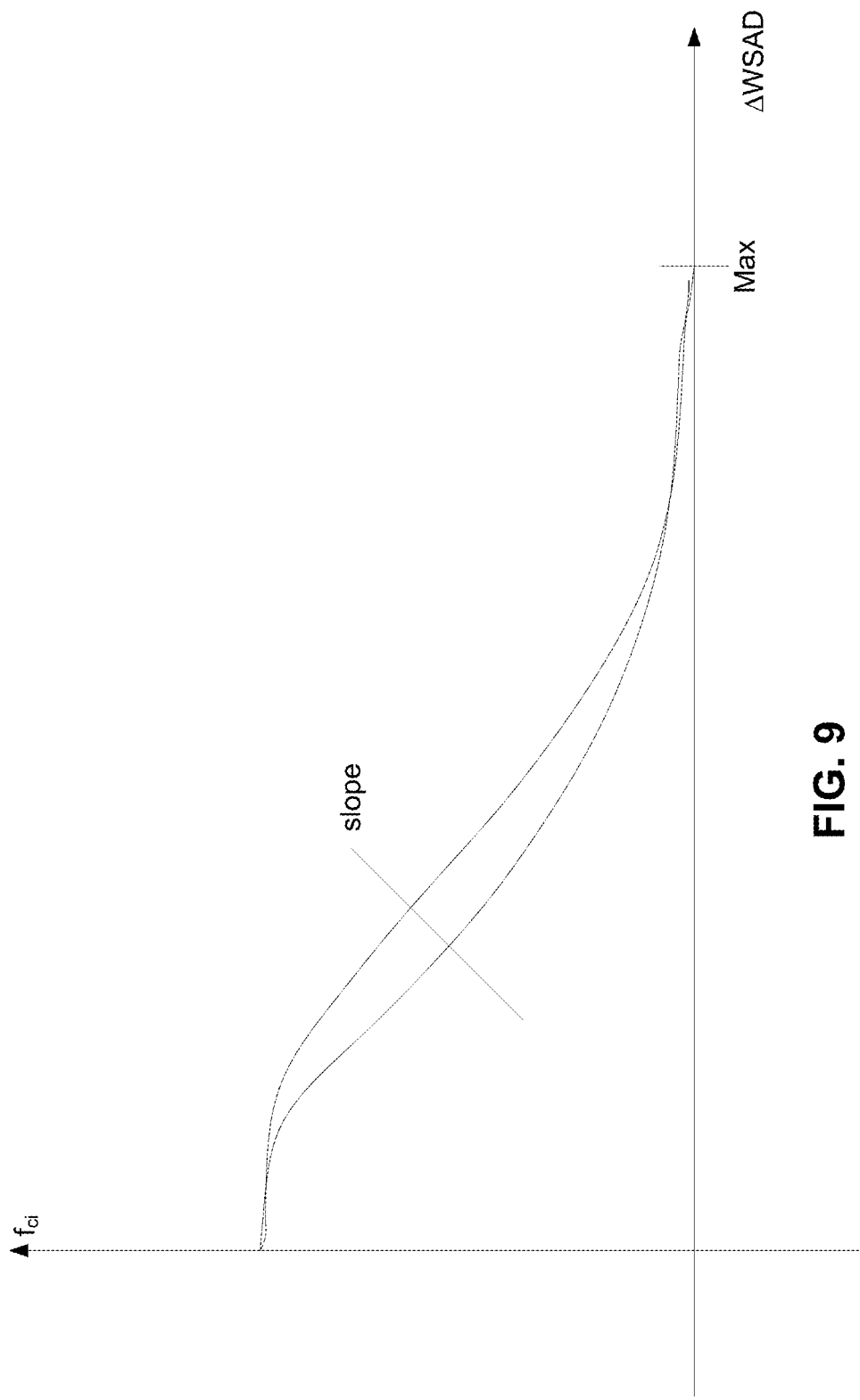
FIG. 9 shows example confidence interval curves as a function of WSAD values according to one example embodiment of the present invention.
Figure 10:
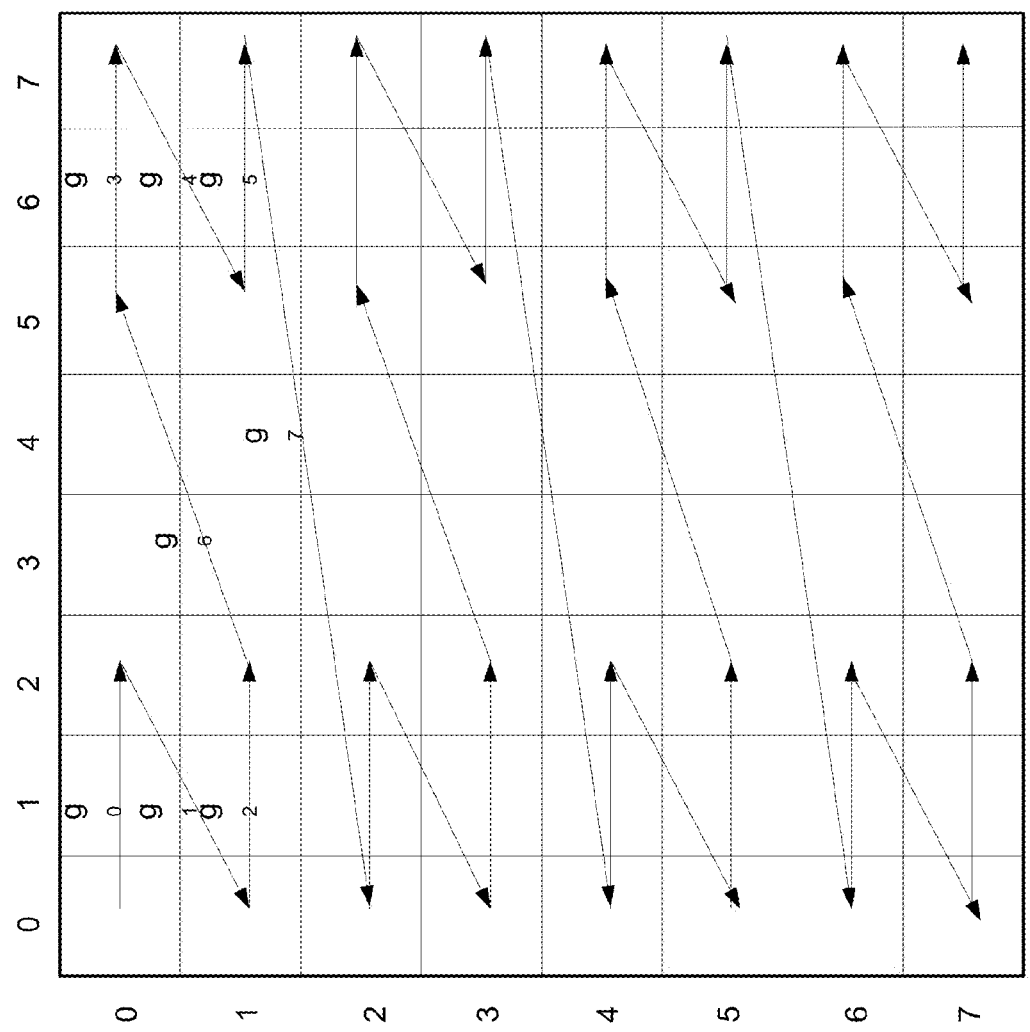
FIG. 10 shows an example pattern for computing directional gradients according to one example embodiment of the present invention.

In one example embodiment of the present invention, confident intervals for noise measurements may be calculated based on the resulting multiple WSADs. FIG. 9 shows example confidence interval curves as a function of WSADs according to one example embodiment of the present invention. The rationale behind confidence interval computation is that quasi-isotropic noise may generate similar values for the N WSAD values computed so that for similar WSAD values, the confident interval values are within a narrow range. On the other hand, a wider variations in the WSAD values in the same block may be an indicator of structured data or anisotropic/directional noise. With a confidence interval function $f_{ci}$ as shown in FIG. 9, a noise measure may be calculated as:

Noise(block$_i$)=$f_{ci}$($\Delta$(WSAD 1, . . . , WSAD N))*g (WSAD 1, . . . , WSAD N), where $\Delta$ is a function that measures the variations among WSAD 1, WSAD 2, . . . , WSAD N. In a situation where there is only two WSAD values, the $\Delta$ may be a simple difference between two WSAD values. In another situation where there are more than two WSADs, the $\Delta$ function may be any one of an average function, a maximum, or a deviation function etc. for WSAD 1, WSAD 2, . . . , WSAD N.

Different $f_{ci}$ functions may be used as shown in FIG. 9. A $f_{ci}$ function with steeper slope may restrict the search for noise. For biased measurement, a non-symmetrical slope may be used. The g( ) is a function of the WSADs. In one example embodiment, g( ) is a function that depends on the minimum of the WSADs with a functional curve similar in behavior to the curve shown in FIG. 9. In other examples, g( ) is a function that depends on the maximum or average of the WSADs. In alternative examples, the g( ) may be curves other than those shown in FIG. 9.

In one advantageous embodiment, the sizes of samples used for calculating WSADs are the same for gathering same energy from the input signal sample. In another advantageous embodiment, blocks of samples may be overlapping for a portion of pixels. The overlapping blocks may provide a more uniform measure and resolve structured data that spans over between block edges and that may not be detected by a simple shift operator.

In one variant embodiment of the present invention, the above discussed WSAD values may be used to analyze flatness of a scene for video compression. One of the situations where artifacts are visible for compressed video is the presence of semi-static area in a normal motion environment, e.g., situations of slow panning camera in background and fast motions in the foreground. These situations may cause a video encoder to reduce picture quality due to less visibility of details. Further, human vision may be sensitive to perceive unnatural changes in a flat or semi-flat area, e.g., a scene of a sky or flat wall, after a long (>2 seconds) exposure to the scene. Encoding techniques, such as frame skipping or intra/inter frame prediction, may achieve high compression rate, but at the same time, may cause sudden small changes that may not be evident in a single frame, but are evident and annoying in a multiple frame playback.

Each picture may be provided with a WSAD-based one dimensional noise measure that biases toward flat areas in very slow motion during playback. These areas may include some details, but are generally perceived as semi-flat. In addition, these areas may retain structured data that may cause visible artifacts if a video encoder produces quantization errors or unnatural motions such as a sudden jump in a motion flow.

A pre-processing/analysis step specifically designed to detect semi-flat areas in slow motions may provide useful biasing information to a video encoder for optimizing, e.g., a final rate distortion. The slow motion background may be conveniently detected by comparing the current picture frame with the previous picture frame for a high correlation may mean small motion vectors. The flatness of an area may be detected using above-discussed WSAD-based noise detection methods.

In one example embodiment of the present invention, each picture frame may include a plurality of overlapping blocks of pixels in the sense each block share at least one pixel with another block. The computation of WSAD for these blocks may be carried out in parallel via a plurality of processors or processing units, e.g., central processing units (CPUs) or graphical processing units (GPUs).

Figure 11:
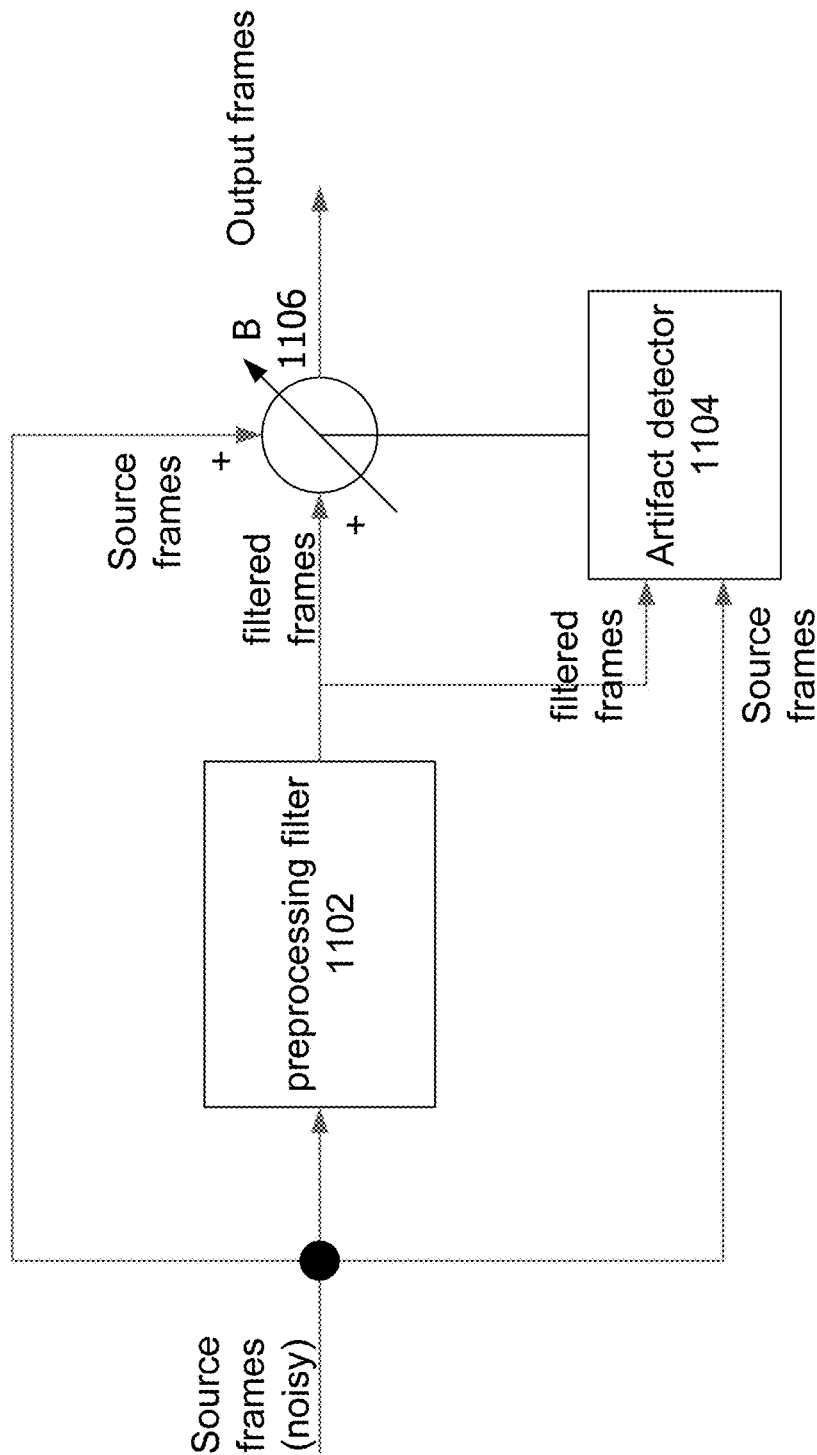
FIG. 11 shows a video frame restoring system that produces output frames with less artifacts according to one example embodiment of the present invention.

In one example embodiment of the present invention, noise analysis may include estimating a blending factor based on the source video and filtered version of the source video. FIG. 11 shows an example embodiment of the video frame restoring system. Noisy source video frames may be filtered with a preprocessing filter 1102 to generate filtered frames. The preprocessing filter 1102 may be known conventional denoise filters that remove noise from a source video. Examples of denoise filters may include motion compensated denoise filters. Alternatively, the preprocessing filter may be other types of filters such as smooth filter or color correcting filter. These filtered frames sometimes may not be desirable because they may be over-filtered and unnatural looking to viewers. An artifact detector 1104 may compute a blending factor $\beta$ based on inputs from source and filtered frames. At 1106, the output video frames may be computed by mixing the source frames with the filtered frames based on the blending factor $\beta$. In one example embodiment, an output frame may be a linear combination of the source and filtered frames, namely, for a particular frame number K:

Output Frame K=$\beta$*Filtered Frame K+(1-$\beta$)*Source Frame K.

In other embodiments, the output frame may be other forms of linear or nonlinear combinations of source and filtered frames.

In one example embodiment, the artifact detector may detect "ghosting" artifacts—trails of slow changing pixels—in video frames. "Ghosting" artifacts tend to happen around edges in video frames. The artifact detector may compute a blending factor $\beta$ for combining source frames with filtered frames to reduce "ghosting" artifacts.

In another example embodiment where the preprocessing filter is a smooth filter, the artifact detector may detect a smoothness level of the video frames. The smooth filter may be designed to remove white noise in the video. However, when video frames are over-smoothed, they may lose fidelities around edges. The artifact detector may compute a blending factor β for combining source frames with filtered frames to reduce the effects of blurring edges.

In another example embodiment where the preprocessing filter is a color correcting filter, the artifact detector may detect overcompensation or overcorrection. The color correction filter may include histogram equalization and/or white balancing. However, when video frames are overcompensated, the video frames may have areas of color saturation or whitened out. The artifact detector may compute a blending factor β based on color saturation for combining source frames with filtered frames to reduce artifacts caused by color correction filters.

In another example embodiment, the blending factor may be determined based on what content a user want in the output frames. For example, when the filtered frames are very smooth, which may tend to cause "banding" artifacts, it may be desirable to keep some noise in video frames. This may be achieved by reducing the amount of noise removed.

Figure 12:
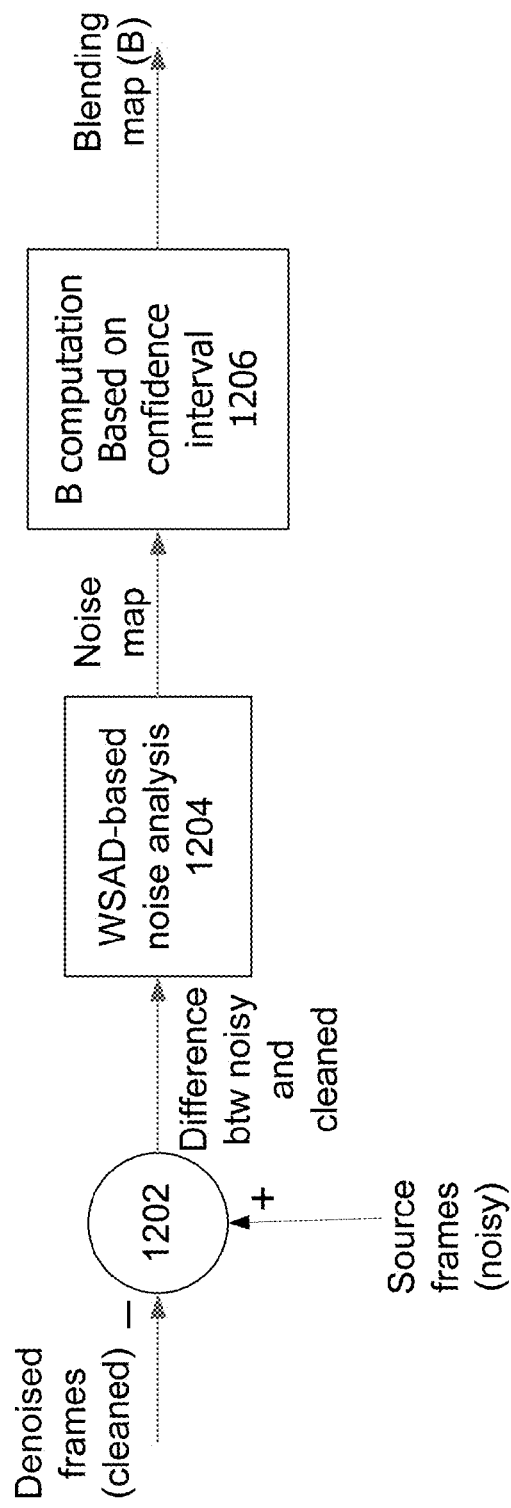
FIG. 12 shows a restore filter for computing a restoring blending factor β using a WSAD based noise analysis according to one example embodiment of the present invention.

The noise analysis may be carried out by using a band-pass filter (not shown) to compute a noise map. Alternatively, the noise analysis may be based on a noise map computed via WSAD analysis. FIG. 12 shows a artifact detector for computing a blending factor β using a WSAD based noise analysis according to one example embodiment of the present invention. At 1202, a filtered frame may be subtracted from its corresponding source frame. For example, a direct pixel to pixel subtraction may be applied, i.e., $P_{final}(i, j) = P_{noisy}(i,j) - P_{clean}(i, j)$, where $P_{noisy}$ and $P_{clean}$ represent pixels from the noisy and clean frames respectively, and i, j represent pixel locations. Alternatively, the subtraction may be performed as a generalized subtraction, e.g., using the weighted sum of absolute differences (WSAD) as discussed above.

At 1204, the WSAD values may be analyzed. For example, WSAD 1, WSAD 2, . . . , WSAD N for N pixel blocks and a confidence interval $f_{ci}$ as described above may be computed. At 1206, a blending factor β may be computed based on WSAD 1, WSAD 2, . . . , WSAD N and the confidence interval $f_{ci}$. For example, for a video picture frame, a histogram of WSAD 1, WSAD 2, . . . , WSAD N for N pixel blocks may be computed. The maximum WSAD_max and minimum WSAD_min of the WSAD values may be further computed from the histogram. For a pixel block K, the blending β factor may then be computed as:

$$\beta = f_{ci} * ((WSAD\_K - WSAD\_min)/(WSAD\_max - WSAD\_min)),$$

where the β is spatially-varying depending on the pixel block K's location and is in the range of [0, 1.0]. Thus the restore filter is a "transparent" filter in the sense that it may not adversely affect picture quality since the worst scenario would restore to the source video frame.

In one example embodiment, the restore filter may be implemented as a preprocessor to a video encoder. For this embodiment, the restore filter may adjust the amount of noise in a source video for optimal encoding. In another embodiment of the present invention, the restore filter may be implemented as a post-processor after a video decoder for improved video display. In yet another example embodiment, the restore filter is not directly connected with a particular video encoder or decoder. In this embodiment, the restore filter is used for improving the perceptual quality of video.

Figure 13:
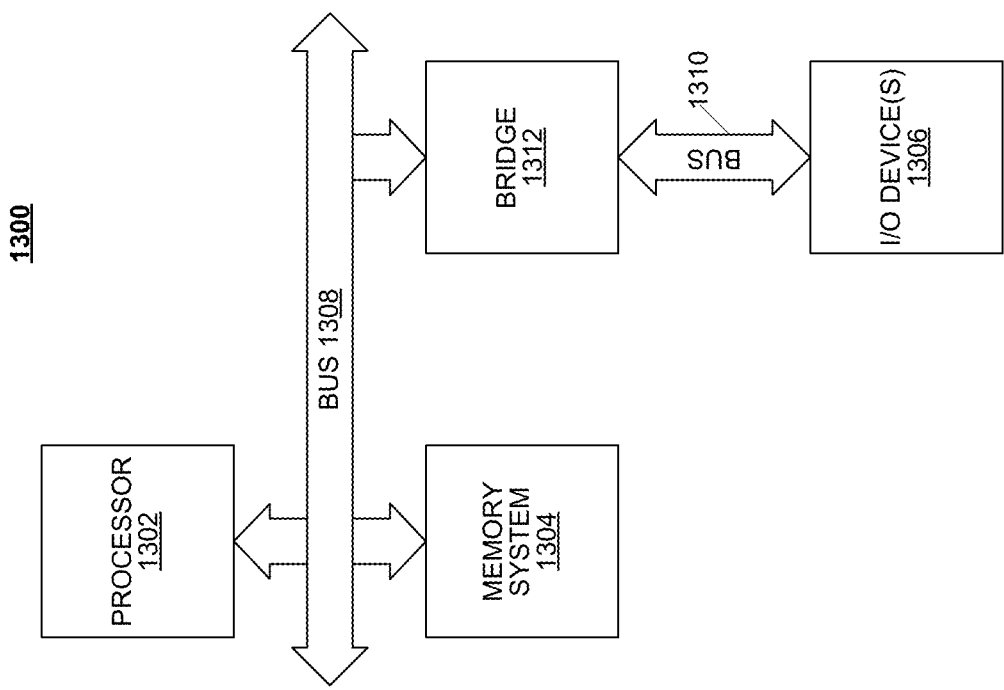
FIG. 13 is an example embodiment of a particular hardware implementation of the present invention.

FIG. 13 is a simplified functional block diagram of a computer system 1300. A coder and decoder of the present invention can be implemented in hardware, software or some combination thereof. The coder and or decoder may be encoded on a computer readable medium, which may be read by the computer system of 1300. For example, an encoder and/or decoder of the present invention may be implemented using a computer system.

As shown in FIG. 13, the computer system 1300 includes a processor 1302, a memory system 1304 and one or more input/output (I/O) devices 1306 in communication by a communication 'fabric.' The communication fabric can be implemented in a variety of ways and may include one or more computer buses 1308, 1310 and/or bridge devices 1312 as shown in FIG. 13. The I/O devices 1306 can include network adapters and/or mass storage devices from which the computer system 1300 can receive compressed video data for decoding by the processor 1302 when the computer system 1300 operates as a decoder. Alternatively, the computer system 1300 can receive source video data for encoding by the processor 1302 when the computer system 1300 operates as an encoder.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for processing a source frame of a video sequence, the source frame including pixel values, comprising:
    filtering the source video to produce a filtered version of the source frame;
    computing an artifact estimation from differences among pixels selected from spatially-distributed sampling patterns in the source frame;
    computing a blending factor based on the artifact estimation in the source frame; and
    computing an output frame by blending the source frame and the filtered version of the source frame based on the blending factor.

2. The method of claim 1, wherein the source frame is filtered with a motion compensated denoise filter to produce the filtered version of the source frame video.

3. The method of claim 1, wherein the artifact estimation in the source frame is computed as a function of the source frame and the filtered version of the source frame.

4. The method of claim 3, wherein the artifact estimation in the source frame is computed by subtracting the filtered source frame from the source frame.

5. The method of claim 3, wherein the function is a confidence interval function.

6. The method of claim 1, wherein the artifact estimation is computed based on a plurality of WSAD values each representing a weighted sum of absolute differences among pixels of a block of pixels, each WSAD value determined from a different sampling pattern taken across the block of pixels.

7. The method of claim 6, wherein the artifact estimation is further determined based on a confidence interval as a function of the plurality of WSAD values.

8. The method of claim 6, wherein the sampling pattern includes a plurality of pixel pairs.

9. The method of claim 6, wherein the sampling pattern is generated randomly.

10. The method of claim 6, wherein the computation of WSAD values further includes:
    shifting each pixel of the pixel block by at least one of horizontally a first offset and vertically a second offset;
    subtracting the shifted block of pixels from the pixel block to compute a shift difference value at each pixel of the pixel block;
    computing a plurality of gradients, wherein each of the plurality of gradients is determined based on an absolute difference between a pair of pixels selected from the sampling pattern; and
    computing the each of the plurality of WSAD values based on a sum of a plurality of weights, wherein each of the plurality of weights is computed as a weight function of the each of the plurality of gradients.

11. The method of claim 1, wherein the blending factor for a pixel block is computed based on a histogram of the plurality of WSAD values for the pixel block.

12. The method of claim 1, wherein the blending factor is spatially-varying within a picture frame of the source frame.

13. The method of claim 12, wherein the blending factor varies over pixel blocks.

14. The method of claim 1, wherein the output frame is a linear combination of the filtered version of the source frame and the source frame based on the blending factor.

15. The method of claim 1, wherein the output frame is based on a nonlinear function as a function of the source frame, the filtered version of the source frame, and the blending factor.

16. The method of claim 1, wherein the source frame is filtered by a smooth filter to remove white noise, and wherein the blending factor is computed based on a measurement of edges in the source frame.

17. The method of claim 1, wherein the source frame is filtered by a color correction filter, and wherein the blending factor is computed based a measurement of color saturation.

18. The method of claim 1, wherein the blending factor is computed based on "ghosting" artifacts in the source frame.

19. A device for processing a source frame of a video sequence, the source frame including pixel values, comprising:
    a preprocessing filter; and
    a processor configured to:
        computing an artifact estimation from differences among pixels selected from spatially-distributed sampling patterns in the source frame;
        filtering the source frame with the denoise filter to produce a filtered version of the source frame, the filtered version being substantially free of noise;
        computing a blending factor based on the artifact estimation in the source frame; and
        computing an output frame by blending the source frame and the filtered version of the source frame based on the blending factor.

20. A non-transitory machine-readable media stored thereon software codes when executed, performing a method for processing a source frame of a video sequence, the source frame including pixel values,
    the method comprising:
        computing an artifact estimation from differences among pixels selected from spatially-distributed sampling patterns in the source frame;
        filtering the source frame to produce a filtered version of the source frame, the filtered version being substantially free of noise;
        computing a blending factor based on the artifact estimation in the source frame; and
    computing an output frame by blending the source frame and the filtered version of the source frame based on the blending factor.

* * * * *